(12) United States Patent
Christen

(10) Patent No.: US 8,578,602 B2
(45) Date of Patent: Nov. 12, 2013

(54) METHOD OF FORMING A FLEXIBLE JOINT WITH RESISTIVE FIELD GRADING MATERIAL FOR HVDC CABLES

(75) Inventor: Thomas Christen, Birmenstorf (CH)

(73) Assignee: ABB Research Ltd, Zurich (CH)

(*) Notice: Subject to any disclaimer, the term of this patent is extended or adjusted under 35 U.S.C. 154(b) by 784 days.

(21) Appl. No.: 12/634,102

(22) Filed: Dec. 9, 2009

(65) Prior Publication Data
US 2010/0139974 A1 Jun. 10, 2010

(30) Foreign Application Priority Data

Dec. 9, 2008 (EP) .................... 08171035

(51) Int. Cl.
*H01R 43/00* (2006.01)
(52) U.S. Cl.
USPC .......... 29/869; 29/858; 29/868; 156/49; 174/84 R
(58) Field of Classification Search
USPC ........ 29/33 F, 33 M, 857, 858, 860–863, 868, 29/869; 156/49, 56; 174/73.1, 76, 84 R, 174/105 SC; 257/659; 428/380–384, 389
See application file for complete search history.

(56) References Cited

U.S. PATENT DOCUMENTS

| 4,032,380 | A | * | 6/1977 | Olsson | 156/49 |
| 5,187,009 | A | * | 2/1993 | Kimura et al. | 428/383 |
| 7,868,079 | B2 | * | 1/2011 | Onneby et al. | 257/659 |

FOREIGN PATENT DOCUMENTS

| WO | WO 00/74191 A1 | 12/2000 |
| WO | WO 2004/038735 A1 | 5/2004 |
| WO | WO 2008/076058 A1 | 6/2008 |

OTHER PUBLICATIONS

European Search Report of Application No. EP 08171035.2 dated May 15, 2009.
A. Roberts, "Stress Grading for High Voltage Motor and Generator Coils", IEEE Electrical Insulation Magazine, Jul./Aug. 1995, vol. 11, No. 4, pp. 26-31.
X. Qi et al., "Engineering With Nonlinear Dielectrics", IEEE Electrical Insulation Magazine, Nov./Dec. 2004, vol. 20, No. 6, pp. 27-34.

* cited by examiner

*Primary Examiner* — Donghai D. Nguyen
(74) *Attorney, Agent, or Firm* — Buchanan Ingersoll & Rooney PC

(57) ABSTRACT

A method of connecting two high voltage DC cables in a flexible cable joint. Each high voltage DC cable can include, from the inside to the outside, a central conductor, an adjacent circumferential cable inner semicon layer, an adjacent circumferential cable insulation layer, and an adjacent circumferential cable outer semicon layer. The method includes: connecting the conductors of the two cables in a cable joint; providing adjacent to the conductors a circumferential joint inner semicon layer connecting the cable inner semicon layers of the two cables; providing at least one circumferential and contiguous layer of field grading material connecting the cable outer semicon layer with the joint inner semicon layer and covering the cable insulation layer of the corresponding cable; providing a circumferential joint insulation layer around the layer of field grading material, and where appropriate around the joint inner semicon layer; and providing a circumferential joint outer semicon layer connecting the cable outer semicon layers of the two cables.

22 Claims, 4 Drawing Sheets

METHOD OF FORMING A FLEXIBLE JOINT WITH RESISTIVE FIELD GRADING MATERIAL FOR HVDC CABLES

RELATED APPLICATION

This application claims priority under 35 U.S.C. §119 to European Patent Application No. 08171035.2 filed in Europe on Dec. 9, 2008, the entire content of which is hereby incorporated by reference in its entirety.

FIELD

The present disclosure relates to joints for high voltage direct current cables (HVDC cables).

BACKGROUND INFORMATION

For the transmission of high voltage (such as in the range of several hundreds of kV) direct current (DC), specific types of cables have been developed which take the particular requirements associated with DC transmission into account. These cables are known as high voltage direct current cables (HVDC cables), and their structure comprises essentially the following elements from the inside to the outside in a radial direction:
- a conducting core or conductor, including a multitude of individual conductors such as copper or aluminium; this conductor is the high-voltage (HV) element;
- a conductor screen ("semiconductor layer", generally called a "semicon") which can be made of an electrically conducting polymer layer, e.g. a polymer layer filled with carbon particles; the polymer layer is generally called an "inner semicon";
- an insulation layer which can be made of cross-linked polymers such as polyethylene;
- an insulation screen which can be made of an electrically conducting polymer layer, e.g. a polymer layer filled with carbon particles ("semiconductor layer"); this element is held on ground potential and is generally called an "outer semicon";
- shielding and protecting layers which essentially do not contribute to the actual insulation of the high-voltage (HV) element.

In such a conductor, the inner semicon, the insulation layer and the outer semicon can be provided as one single polymer layer which is made in an extrusion process. The inner semicon layer and the outer semicon layer are made by providing the radially innermost and the radially outermost regions of this polymer layer with a corresponding carbon black filler.

In alternating current (AC) electricity transport, for which differences in the dielectric constant of different insulating materials are crucial in the distribution of the electric field around high voltage parts, the dielectric constant generally does not vary more than by a factor of 1-3 for commonly used materials. In contrast to AC electricity transport, for high voltage direct current transport, the resistivities of the insulating materials are of greater significance than the dielectric constants of the insulating materials, which can vary by factors of 100 or more. This phenomenon creates an impetus for a more careful analysis of the electric field distribution, such as in a situation where cables are connected in a way that the insulation is not simply terminated in a cable termination element but has to be continued in a cable joint. The variation in the resistivity is particularly problematic in view of the fact that resistivities show a high temperature dependence, and as a result, the matching of resistivity of insulation materials may not be possible for all temperatures.

Accordingly, specific prefabricated cable joints have been developed for such HVDC cables which ensure that the distortions of the electric field distribution in the insulating material are small in order to avoid field enhancements and concomitant electric breakdown.

It is known to use tape-based cable joining technology for flexible connections between HVDC cables. Flexible joints for HVDC light cables can be made by lapping and successively vulcanizing semi-conductive and insulating tapes around the cable. Then, the lead and polyethylene jacket sheaths, and the armouring are mounted. The joint-cable interface can have a conical shape.

Among other things, there is the consideration that the electric field distribution in the interface region between the cable insulation material and the joint insulation material is made as homogenous as possible. According to conventional techniques, the homogeneity of the interface region can be obtained by matching the electrical properties of the joint insulation and the cable insulation as close as possible. In particular, the resistivity ratio, which determines the field distribution in the cable joint region at DC voltages, is made close to one. However, this requires a high quality and extremely well controlled process.

SUMMARY

An exemplary embodiment provides a method of connecting two high voltage direct current cables in a cable joint, wherein each high voltage direct current cable comprises, from an inside portion to an outside portion in a radial direction, a central electrode, a circumferential cable insulation layer, and an outer electrode layer. The exemplary method can include steps of: (a) connecting the central electrode of the two cables; (b) providing at least one circumferential and contiguous layer of field grading material connecting the outer electrode layer with the central electrode and contiguously covering the cable insulation layer of the corresponding cable; (c) providing a circumferential joint insulation layer around the layer of field grading material; and (d) providing a circumferential joint outer electrode layer connecting the cable outer electrode layers of the two cables.

Another exemplary embodiment provides a cable joint connecting two high voltage direct current cables, wherein each high voltage direct current cable comprises, from an inside portion to an outside portion, a central conductor, an adjacent circumferential cable inner semicon layer, an adjacent circumferential cable insulation layer, and an adjacent circumferential cable outer electrode or semicon layer, and the cable joint is manufactured in accordance with the above-described exemplary method.

BRIEF DESCRIPTION OF THE DRAWINGS

Additional refinements, advantages and features of the present disclosure are described in more detail below with reference to exemplary embodiments illustrated in the drawings, in which:

FIGS. 4, 5 illustrate detailed cuts through a flexible joint according to exemplary embodiments of the present disclosure, in which FIG. 4 illustrates a configuration where the central electrodes are connected using a clamp, and FIG. 5 illustrates a configuration where the central electrodes are connected by a connector weld;

FIGS. 9, 10 show two possibilities of field grading material topologies, in which FIG. 9 illustrates a situation of field grating material topologies fully going through, and FIG. 10 illustrating a situation in two parts.

DETAILED DESCRIPTION

Figure 1:
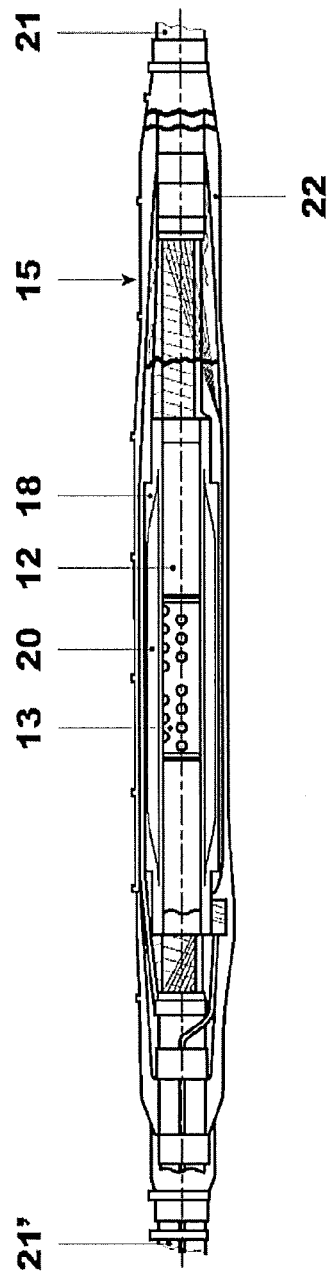
FIG. 1 illustrates an axial cut through an exemplary prefabricated cable joint for HVDC cables, according to at least one embodiment.

Exemplary embodiments of the present disclosure provide an improved cable joint for high voltage direct current (HVDC) cables, as well as methods for making the same. The cable joint can be made flexible, and can be tape wound.

Exemplary embodiments of the present disclosure provide a method for connecting two HVDC cables in a flexible cable joint, wherein each HVDC cable can include, from an inside portion to an outside portion measured in a radial direction, a central conductor (such as a central electrode, which may be constituted by a bundle of individual copper or aluminium conductors, for example), an adjacent circumferential cable inner semicon layer (such as a (Carbon black) filled polymer layer; may be optional), an adjacent circumferential cable insulation layer, and an adjacent circumferential cable outer semicon layer (such as an outer electrode layer structured to be a semicon layer for the ground potential typically a filled polymer layer). Additional layers such as shielding layers, mechanical protection layers and the like can be provided outside the cable structure. This type of cable can be implemented in the field of HVDC transmission.

Exemplary embodiments of the present disclosure provide a method that can include the following steps:
a. connecting the central electrode of the two cables;
b. providing at least one circumferential and contiguous layer of field grading material connecting the outer electrode layer with the central electrode and contiguously covering the cable insulation layer of the corresponding cable (the field grading material layer thereby separates the cable insulation and the joint insulation);
c. providing a circumferential joint insulation layer around the layer of field grading material;
d. providing a circumferential joint outer electrode layer connecting the cable outer electrode layers of the two cables.

As indicated above, the cable structures can include an inner semicon layer, and the outer electrode is given as an outer semicon layer. In this case, the method can include the following steps
i. connecting the conductors of the two cables, such as in a cable joint;
ii. providing adjacent to the conductors a circumferential joint inner semicon layer connecting the cable inner semicon layers of the two cables;
iii. providing at least one circumferential and contiguous layer of field grading material connecting the cable outer semicon layer with the joint inner semicon layer and covering the cable insulation layer of the corresponding cable in the region between the cable outer semicon layer and the joint inner semicon layer;
iv. providing a circumferential joint insulation layer around the layer of field grading material and where appropriate around the joint inner semicon layer; and
v. providing a circumferential joint outer semicon layer connecting the cable outer semicon layers of the two cables.

It should be noted that even in case that the cable structures include an inner semicon layer it is optionally also possible not to include above step ii., the layer of field grading material can also directly contact the conductor and take over the function of the inner semicon layer. It should furthermore be noted that the outer semicon layer may be provided by an additional layer of field grading material.

An advantageous aspect of the present disclosure is that when making a flexible cable joint connection, care is taken that the distribution of electric field in the insulation layer is as homogeneous as possible. As pointed out above, currently this is reached by matching the electrical properties of the joint insulation and the cable insulation as well as possible. In particular the resistivity ratio, which determines the field distortion in the interface region, can be adjusted to be close to one. If the resistivity ratio differs from one, the field can be concentrated in the material with the higher resistivity. Because it is difficult to control the resistivity of insulators, a very good control of the production process is involved, and the tape can be limited to a specific material. Even if specific materials are chosen, there remains the issue of the dependence of the resistivities on the temperature and the fact that under operating conditions the temperature may vary over large ranges.

Exemplary embodiments of the present disclosure provide a layer with comparatively lower resistance (referred to herein as a field grading material, FGM) which is placed in between the two insulators, such that it connects the two potentials (ground and HV, i.e. cable outer semicon layer and joint inner semicon layer or conductor), and the potential along this layer is well defined. By this, the two insulators cable insulator and joint insulator are electrically decoupled for DC voltage. This leads to a homogeneous voltage drop, as is illustrated in the specific description below. This field grading material layer in particular largely obviates the problems associated with the temperature dependences of the resistivities of different materials.

According to an exemplary embodiment, the field grading material can have a resistance which is much lower than the resistance of the insulation layer. For example, the resistance of the field grading material can be a factor of 50-1000 lower than the minimum resistance of the insulation materials of the cable or the joint. The field grading material can be a material whose resistivity is dependent on the applied electric field, wherein this dependence can be linear or non-linear. As materials of this kind are known in the field, reference is for example made to WO 2004/038735, the content of which is expressly incorporated by reference into the present specification as it concerns possible systems for the field grading material.

The proposed disclosure has the potential to make the severe process conditions easier, and to open the possibility to use a larger class of joint insulation tape materials. Furthermore, as recent trends are to go to higher and higher voltage levels, it is likely to become unavoidable in the future to make the flexible joints more robust from an electrical or electrothermal point of view.

In a first exemplary embodiment of the present disclosure, for at least one of or all of the above-described steps b-d and/or ii-iv, a polymer based tape of the corresponding material can be wound around the region to be joined, or a polymer based sleeve can be shifted or wrapped around the region to be joined.

In step ii, a tape made of conductive polymer material, such as cross-linked or crosslinkable polyethylene tape material which is filled with carbon black particles or the like, for example, can be used for making the circumferential joint inner semicon layer.

In step b and/or step iii, a tape made of the above-mentioned field grading material can be used; this tape can be a polymer based tape material, such as cross-linked or crosslinkable polyethylene, which is filled with corresponding particles leading to the field grading properties, for example.

In step c and/or step iii, a tape can be used based on a polymeric material which is therefore highly resistive. Exemplary types of tape can include, for example, cross-linked or crosslinkable polyethylene tape.

In steps d and/or v, essentially the same type of tape can be used as in the above-mentioned step ii.

After step d and/or step v, the joint can be vulcanised by applying heat and/or irradiation, leading to a cross-linked layer structure in the joint in which the inner semicon layer, the field grading material layer, the insulation layer, and the outer semicon layer are contiguous and essentially free from air gaps and the like leading to optimum insulation and electric field conditions. Also possible is the application of typically circumferential radial pressure in the joint region in order to compact the structure, either in addition to or as an alternative to the above-mentioned vulcanisation.

According to a further exemplary embodiment, in steps b and/or iii, a single circumferential and contiguous layer of field grading material can be provided to connect the cable outer semicon layer of the first conductor with the joint inner semicon layer on the one side and connect the cable outer semicon layer of the second conductor with the joint inner semicon layer on the other side so as to completely cover the joint inner semicon layer in the joint region is applied. As mentioned above, the field grading material layer can connect the inner semicon layer (or more generally the inner electrode) and the outer semicon layer (or more generally the outer electrode) in the joint region. Therefore, two individual and separate field grading material layer sleeves can be provided for each of the two cables to be connected; it is however also possible to have one single field grading material layer sleeve which correspondingly via the joint inner semicon layer connects the two outer semicon layers of the cables (in this case, it is even possible to leave out the inner semicon layer of the joint).

A further exemplary embodiment provides that the section of the cable insulation layer which is covered by the layer of field grading material in steps b and/or iii is shaped as a cone converging towards the respective terminal end of the respective cable. Therefore, two cones are provided in the joint, one for each cable, which are pointing towards each other in the joint region. To have this conical structure of the insulating portion of each of the cables has the advantage that when winding tape material in the step of forming the flexible joint there is no abrupt geometrical step which can lead to problems when not correctly positioning tape layers and which may lead to locations where discharge can take place. According to an exemplary embodiment, an angle (a) between an axial direction with respect to the axis of the conductor and the plane of this cone (at the position of the axial direction) can be in the range of 5-45°, such as 10-20°, for example.

According to an exemplary embodiment, prior to step a and/or i, each of the cables can be prepared for the exemplary method by carrying out wire stripping operations in the terminal regions.

This procedure may be implemented so that prior to step a and/or i, each of the cables is prepared in a terminal region of the cable, and the conductor is completely bared circumferentially (thus exposing the conductor material, i.e. the multitude of copper or aluminium conductors). According to an exemplary embodiment, the conductor can be exposed over an axial length of at least 2-30 cm, such as over a length of 10-25 cm, for example.

In an adjacent region further away from the terminal end of the cable, the cable inner semicon layer can be bared, i.e. the outer surface of the cable inner semicon layer can be exposed radially. This region where the outer surface of the cable inner semicon layer is exposed can extend over an axial length of 0-10 cm, such as over a length of 0.5-5 cm, for example.

Even further away from the terminal end of each of the cables, there can be provided a further adjacent region, in which the cable insulation layer is shaped in an essentially conical shape as mentioned above converging towards the terminal end of the cable. In this conical region in the above-mentioned steps b and/or iii, the field grading material is covering this conical part in a contiguous manner. For a radial thickness D of the insulation layer in the range of 0.5-4 cm, this conical section can extend, for example, in an axial direction for a length of $Z=D/\tan(\alpha)$.

In a further subsequent region, the cable insulation layer can be bared circumferentially, i.e. the insulation layer can be completely exposed in a radial direction. This region can extend in an axial direction over a length of 0-10 cm such as over a length of 0.5-5 cm, for example.

In an even further subsequent region, the cable outer semicon layer can be bared, i.e. it is exposed in a radial direction, to, among other reasons, allowing contact with the field grading material layer in the above-mentioned steps b and/or iii.

As mentioned above, the field grading material used in steps b and/or iii can be a polymer based resistive field grading material, for example in the form of a tape. A field grading material generally means that the material is able to reduce local electric field enhancements so that the electric field exceeds nowhere the breakdown strength, thus eliminating the risk of electric breakdown. For a definition and possible materials see for example A. Roberts, *Stress grading for high voltage motor and generator coils*, IEEE Electrical Insulation Magazine, Vol 11, No 4, 1995, p. 26 or Qi et al, *Engineering with non-linear dielectrics*, IEEE Electrical Insulation Magazine, Vol 20, No 6, 2004, p. 27). According to a exemplary embodiment, this field grading material is made of a polymeric matrix provided with a filler, wherein the filler comprises a field grading effective amount of particles of a semiconducting material having an energy bandgap larger than 0 eV and smaller than 5 eV, such as ZnO or SiC, for example, wherein the particles can have at least one dimension smaller than or equal to 100 nm, such as one dimension between ranges of 2-80 nm, 5-50 nm, and 5-30 nm, for example.

The field grading material can be a linear or nonlinear resistive material. It can be placed, e.g., by winding a vulcanizing field grading material tape (e.g., a polymer containing SiC or ZnO fillers etc.) after the semicon tape for the inner semicon layer of the joint was wound, or by mounting a specially shaped vulcanizing tube prior to cable connection etc. As a connection of ground and HV is important, there can also be different topologies as shown in more detail in the description further below.

According to another exemplary embodiment of the disclosure, in step a and/or step i, a sleeve or clamp, such as a metallic sleeve or clamp, for example, can be used into which each of the terminal ends of the conductors of the cables are shifted and fixed therein by positive engagement and/or form closure and/or closure by adhesive force. Fixation can be effected by mechanical connections such as clamping, bolting, nuts and bolts connections, screws and the like, and/or by providing adhesives. Also possible is the use of welding techniques and the making of a conductor weld between the two central electrodes.

A further exemplary embodiment of the proposed method provides that the cable inner semicon layer, the cable insulation layer and the cable outer semicon layer of one or of each of the cables are made of one single extruded polymer material. This polymer material can be cross-linked material, e.g. a cross-linked polyethylene material. For example, the innermost region of this polymer material can be provided with a conductive filler to form the inner semicon layer, the cable insulation layer is highly resistive, and the outermost region of this polymer material is provided with a conductive filler to form the outer semicon layer. The filler of the inner and the outer semicon layer can be provided by carbon black particles. For example, the inner semicon layer can have a thickness (in a radial direction) in the range of 0.5-2 mm, the cable insulation layer (in a radial direction) can have a thickness D in the range of 5-40 mm, and the outer semicon layer (in a radial direction) can have a thickness in the range of 0.5-3 mm.

Exemplary embodiments of the present disclosure also provide a flexible cable joint connecting two HVDC cables, wherein each HVDC cable can include, from an inside portion to an outside portion, a central conductor, an adjacent circumferential cable inner semicon layer, an adjacent circumferential cable insulation layer, and an adjacent circumferential cable outer semicon layer, obtainable or obtained in a method as described above.

According to an exemplary embodiment of such a flexible cable joint, the HVDC cables can include, outside of the outer semicon layer, at least one of the following layers: swelling tape layer, lead alloy sheath layer, polyethylene jacket layer, tensile armor layer, such as those including galvanised steel wires, for example, outer cover layer, aluminium laminate layer, and metallic screen layer, such as those including copper wires, for example.

According to an exemplary embodiment, the outer diameter of the joint region can be less than 15% larger than the outer diameter of the cables with all circumferential layers. According to another exemplary embodiment, the outer diameter of the joint region is not more than 10% larger or not more than 5% larger than the outer diameter of the cables or can have essentially the same outer diameter as the cables, so that the joint, in contrast to prefabricated stiff cable joints, is very slim and does not provide a bulging area in the region of the joint.

According to a further exemplary embodiment, such a cable joint is tape wound and flexible meaning that the possible radius of curvature of the cable portion with the joint is between 5-20 times, such as between 8-15, of the cable diameter. This allows good cable handling and e.g. to wind a cable with such a flexible cable joint onto a roll or a cable sheave without problems which has proved difficult to do using a prefabricated joint.

Exemplary embodiments of the present disclosure also provide the use of a method as described above for connecting two (not necessarily but possibly identical) HVDC cables comprising at least, from an inside portion to an outside portion in a radial direction, a central conductor, an adjacent circumferential cable inner semicon layer, an adjacent circumferential cable insulation layer, and an adjacent circumferential cable outer semicon layer, and optionally outside of the outer semicon layer at least one of the following layers: swelling tape layer, lead alloy sheath layer, polyethylene jacket layer, tensile armour layer, such as those including galvanised steel wires, for example, outer cover layer, aluminium laminate layer, metallic screen layer, such as those including copper wires, for example. This in particular leading to the formation of a flexible cable joint as mentioned above.

The drawings illustrate exemplary embodiments of the present disclosure. The exemplary embodiments described are illustrative and the present disclosure is not limited thereto. FIG. 1 shows, in an axial cut, an exemplary prefabricated cable joint for connecting high voltage direct current cables (HVDC cables) in a stiff manner.

In this respect it should be pointed out that there are generally two different types of connecting elements used in the field of HVDC cables. One type is the so-called prefabricated or pre-moulded cable joints for which, as its name suggests, prefabricated separate units are adapted specifically to the cables to be connected. Prefabricated or pre-moulded cable joints can be mounted or installed at the location where the cable is installed; due to their rigidity, it is difficult to use such prefabricated or pre-moulded cable joints if the cable is to be wound on a cable sheave (cylindrical roll). On the other hand, the other type of connecting element is the so-called flexible or tape wound or tape moulded cable joints, which are also referred to as a flexible vulcanised joint or flexible factory joint. In this second type of connecting element, there is no prefabricated separate joint unit. However, the joint can be made by connecting the central conductors and subsequently applying several layers of tape winding around for the formation of the actual joint. These flexible joints can also be used for cables which are to be reeled onto cable sheaves.

In an exemplary prefabricated cable joint illustrated in FIG. 1, two HVDC cables 21 and 21' are joined in such a rigid prefabricated cable joint 15. The actual central conductor 12, by which a central electrode of the cable is formed, can be exposed in the respective terminal regions of the conductor 21, 21'. The two exposed or bared conductor portions can be joined by means of a metallic connecting sleeve 13 into which, the conductor portions can be shifted on both sides. The connecting sleeve 13 can be subsequently clamped to lead to a strong mechanical and electrical connection between the two conductors.

The prefabricated or pre-moulded cable joint can include, within a housing 22, in the region surrounding the connecting sleeve 13, an insulation part 20, and an inner conductive rubber part 19 disposed between the connecting sleeve 13 and the insulation part 20. An outer conductive rubber part 18 can be provided outside the insulation part 20.

Figure 2:
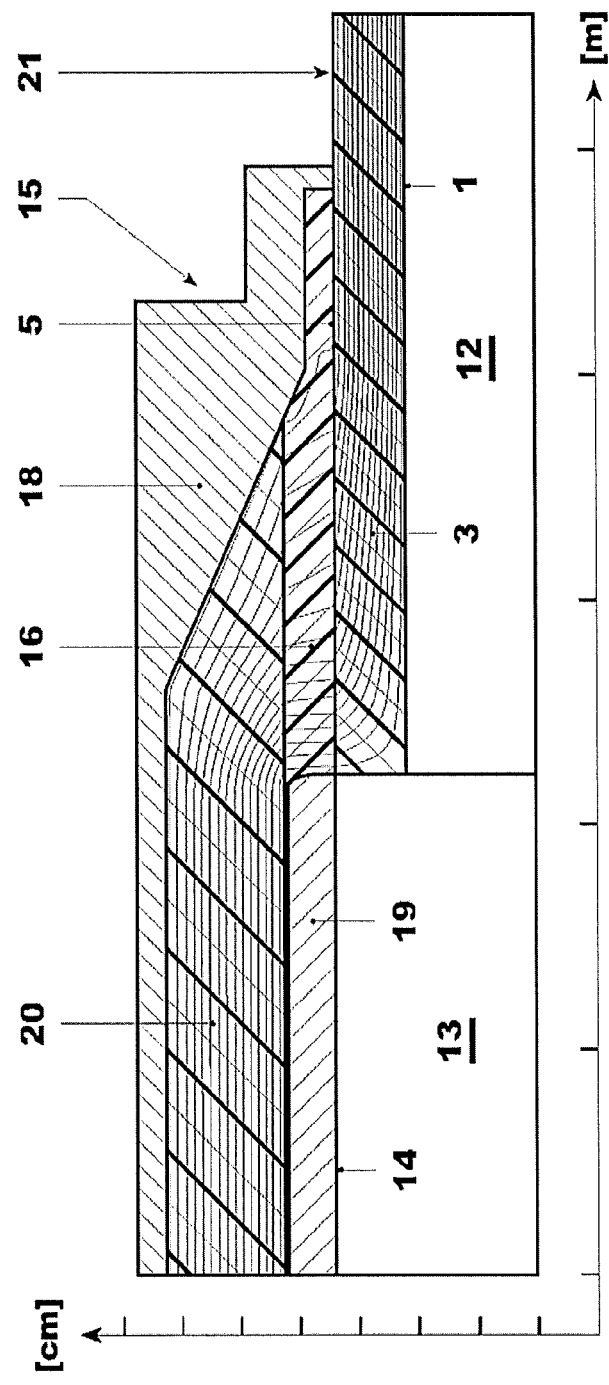
FIG. 2 shows the electric field distribution in the transition region from the cable to the cable joint of an exemplary prefabricated cable joint.

FIG. 2 illustrates electrical conditions which are relevant in the context of the exemplary rigid cable joint illustrated in FIG. 1. FIG. 2 displays one of the two symmetrical half parts of FIG. 1 in a detailed view including the electrical field lines in the insulation material. It can be seen that, in the central region, there is provided the connecting sleeve 13 (shown as an elevation view in FIG. 2) in which the conductor 12 (shown as an elevation view in FIG. 2) is mechanically fixed. Furthermore, it can be seen that the conductor 12 of the cable can be circumferentially surrounded by a cable insulation layer 3. In addition, a cable inner semicon layer 1 is provided between the cable insulation layer 3 and the conductor 12. A cable outer semicon layer 5 is provided at the outside of the cable insulation layer 3.

In FIG. 2, the rigid cable joint parts are denoted by the constituent elements above line 14. Therefore the rigid cable joint includes, in the region of the connecting sleeve 13, an inner conductive rubber part 19 and an insulation part 20 provided in an outer radial direction. A section and/or layer of field grading material 16 is provided axially adjacent to the inner conductive rubber part 19. This field grading material layer or section 16 connects the outer semicon layer 5 of the cable and the inner conductive rubber part 19 in an axial direction. An outer conductive rubber part 18 of the rigid cable joint is provided radially outside of these elements.

As can be seen from the illustrated electric equipotential lines, the essentially axial field from the insulation part 3 of the cable coming from the right is essentially homogeneously diverted in a radial direction by means of the field grading material element 16 and is then smoothly redirected in an axial direction in a conically widening section of the insulation part 20 which is adjacent to the field grading material element 16.

Accordingly, exemplary embodiments of the present disclosure provide flexible cable joints.

Figure 3:
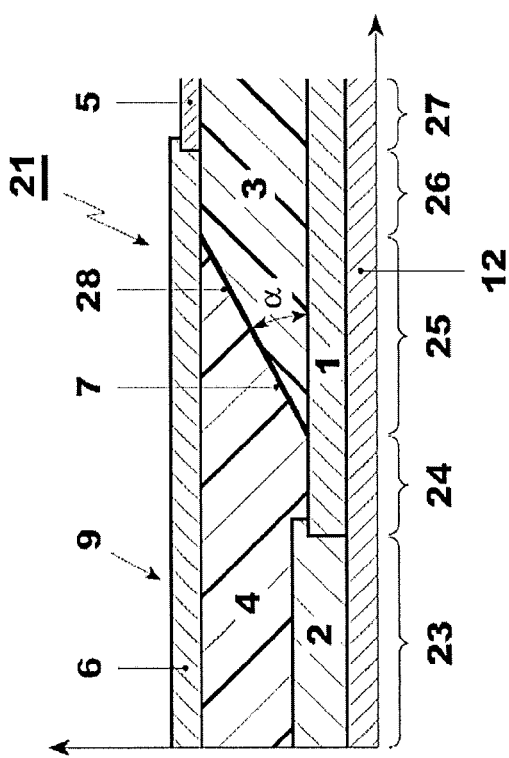
FIG. 3 is a sketch of an exemplary flexible joint in which the tilted line indicates an interface between joint insulation and cable insulation.

According to an exemplary embodiment, the flexible cable joint can be produced so that the insulation of two cables in the terminal parts thereof is first removed and subsequently the actual joint can be produced by winding corresponding tapes in the joining region. FIG. 3 illustrates an exemplary embodiment illustrating an axial cut showing half of such a flexible cable joint in accordance with the present disclosure.

As a preparation for making such a flexible cable joint, the actual cable (coming from the right in FIG. 3) can be stripped, for example, in a terminal region 23 so as to expose the actual conductor 12. Following the terminal region 23, a region 24 is provided in which the cable inner semicon layer 1 is exposed in a radial direction, followed by a region 25 in which the cable insulation layer 3 is shaped as a cone 28, the tip of which points to the end of the cable. According to an exemplary embodiment, the angle a between the axial direction with respect to the axis of the conductor and the plane of the cone 28 (at the position of the axial direction) can be in the range of 5-45°, such as 10-20°, for example. The conical section 25 is followed by a region 26 in which the cable insulation layer 3 is exposed circumferentially and by a further region 27 in which the cable outer semicon layer 5 is exposed radially. The cable outer semicon layer 5 can more generally be described as an outer electrode layer 5. This prepared cable can then joined to a corresponding symmetrical cable (to be imagined on the left side of FIG. 3), after having connected the conductors 12 by means of a connecting element (such as a sleeve as described above, for example), in that an inner joint semicon layer 2 is first made by winding a corresponding tape material (such as a polyethylene tape, for example) as indicated in FIG. 3, in such a manner so as to connect the cable inner semicon layers 1 of the two cables (in an exemplary embodiment described above, the inner semicon layer 1 may be omitted and its function performed by the field grading material layer). In another exemplary embodiment, a different kind of tape material, such as a non-filled tape material, for example, can then be used to make the joint insulation layer 4 by winding the tape material in the region as illustrated in FIG. 3, such as by covering the interface 7 in the tilted or conical section 25 of the insulation layer, for example. Subsequently, the same or a similar tape material as used for the layer 2, such as a carbon black filled tape, for example, can be used for making the joint outer semicon layer 6 in such a manner so as to connect the cable outer semicon layers 5 of the two cables. The joint outer semicon layer 6 can more generally be described as a joint outer electrode layer 6. Subsequent to these operations, the whole joint can be vulcanized by applying heat or by irradiation, for example, so as to form a solid unit and fuse all the layers 2, 4 and 6 with the materials of the layers 1, 3 and 5.

If the two materials of the layers 3 and 4 have equal resistivities, such a cable joint leads to electric field distributions as illustrated in FIG. 6*a*). This would be an ideal situation, which however may not be achieved in practice due to the existence of differences between the resistivities of the extruded insulation layer 3 of cables and of the vulcanized tape insulation layer 4.

In practice, therefore, there will normally be a difference in resistivity, and the consequence of such differences is illustrated in FIGS. 6*b*) and *c*). FIG. 6*b*) illustrates an example where the insulation layer 4 has a resistivity that is ten times higher than that of the insulation layer 3 of the cable, and FIG. 6*c*) illustrates an example where the resistivity of the insulation layer of the cable is ten times higher than the resistivity of the insulation layer 4 of the joint. The corresponding distortions of the electric field lines are unacceptable in particular if higher voltages shall be applied.

If, in the above-mentioned process of making such a joint prior to the application of the layer 4, a field grading material layer 10 (see FIGS. 4, 5, 9 and 10) is produced at the interface 7 as illustrated in FIG. 3 in a manner connecting either directly or indirectly the cable outer semicon layer 5 with the joint inner semicon layer 2, then problems can be mitigated and a rather homogenous electric potential distribution as illustrated in FIG. 6*d*), in which the resistivities of the two sections 4 and 3 also differ by a factor of 10, can be obtained.

Figure 4:
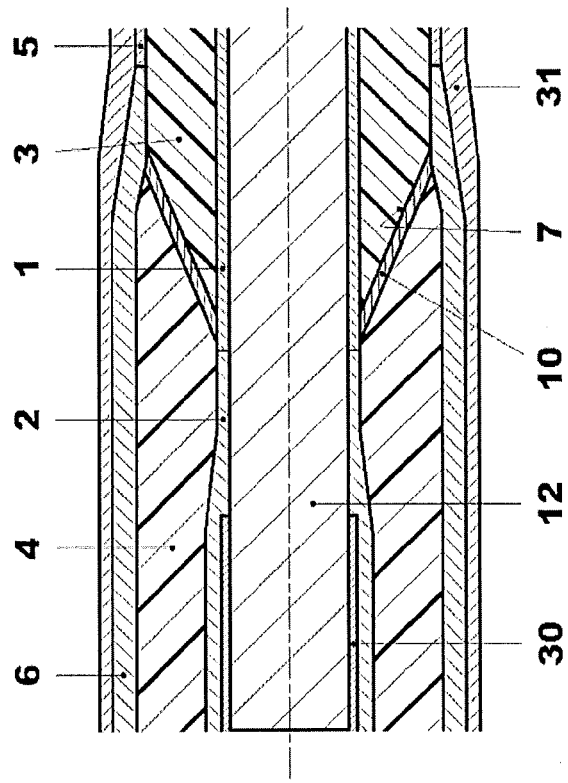
Figure 5:
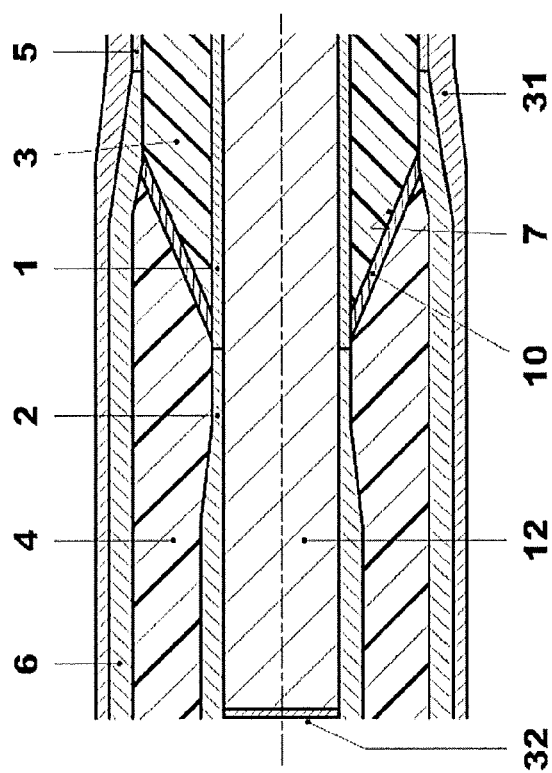

FIGS. 4 and 5 show two different exemplary embodiments of a tape wound joint according to the present disclosure in more detail. In both embodiments, the inner semicon layer 1 is electrically connected to the joint outer semicon layer 6 by the field grading material layer 10. The field grading material layer 10 is located in the axial direction of the cable between the cable insulation layer 3 and the joint insulation layer 4. Hence, the interface 7 of the cable insulation layer 3 is continuously covered by the field grading material layer 10. The field grading material layer 10 is connected by the inner semicon layer 1 to the central electrode 12 and by the joint outer semicon layer 6 to the outer semicon layer 5 of the cable.

In FIG. 4, a flexible cable joint is shown in which the two central electrodes 12 are connected using a connector clamp 30 as an example of the connecting element. Further structural elements of the flexible joint are designated using the same reference numerals as those used in FIG. 3. Specifically indicated in this case is the peripheral cable/joint jacket layer 31 which may also include also additional shielding layers etc. FIG. 5 illustrates an exemplary embodiment in which, in the case of flexible joints, the central conductors 12 can be joined by means of a conductor weld 32, for example.

Figure 6:
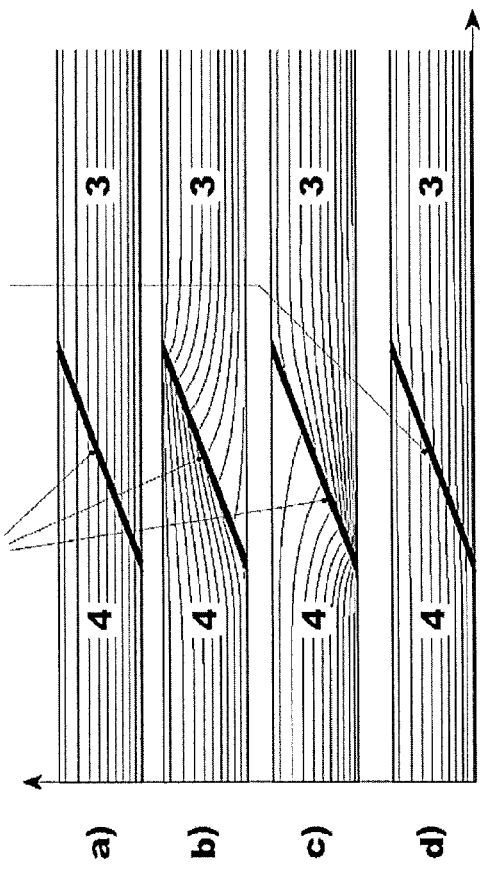
FIG. 6 shows examples of the DC potential distribution in an exemplary flexible joint, wherein part a) illustrates the situation without a field grading material layer assuming equal resistivities of the insulation layers of the cable and the joint, part b) illustrates the situation without a field grading material layer assuming a 10× higher resistivity of the joint insulation layer, part c) illustrates the situation without a field grading material layer assuming 10× higher resistivity of the cable insulation layer, and part d) illustrates the situation where a linear resistive field grading material layer is provided for differing resistivities of cable and joint insulation layers.
Figure 8:
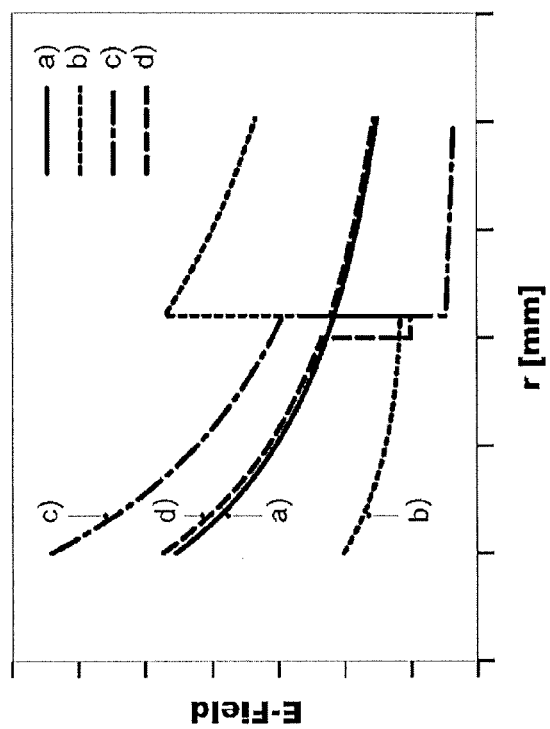
FIGS. 7, 8 FIG. 8 shows the DC electric fields along the line 11 plotted in the FIG. 7 for the cases a)-d) shown in FIG. 6, wherein the graph a) in FIG. 8 corresponds to the situation a) of FIG. 6, the graph b) in FIG. 8 corresponds to the situation b) of FIG. 6, the graph c) in FIG. 8 corresponds to the situation c) of FIG. 6 and the graph d) in FIG. 8 corresponds to the situation d) of FIG. 6.
Figure 7:
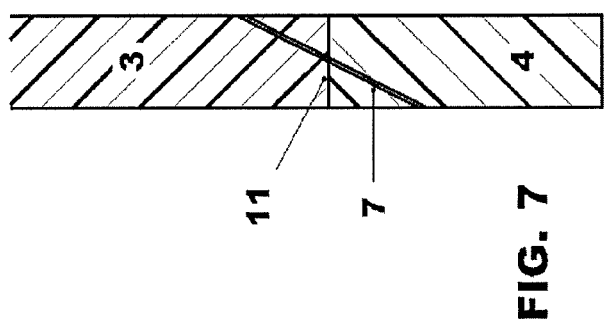

Indeed, as illustrated in FIG. 8, with the electric field given along the line 11 in FIG. 7, it can be seen that in the ideal situation a) according to FIG. 6, one has a homogeneous and smooth electric field distribution without abrupt changes. In complete contrast however, in the real world situations b) and c) according to FIG. 6, one has dramatic steps at the interface between the two materials 3 and 4, leading to problems with discharge and the like. As can be seen from the corresponding distribution illustrated with the line d) standing for the situation illustrated in FIG. 6, situation d), one has a smaller electric field in the region of the field grading material 10 (the dip at the radius of around 20 to 21 mm), due to the higher conductivity of the field grading material layer, however one has apart from that a smooth overall behaviour (i.e. without significant field enhancements) between the section in the material 3 and in the material 4.

Figure 9:
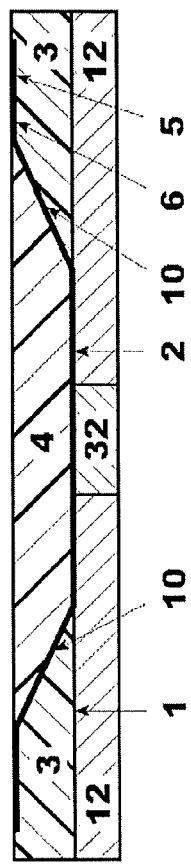
Figure 10:
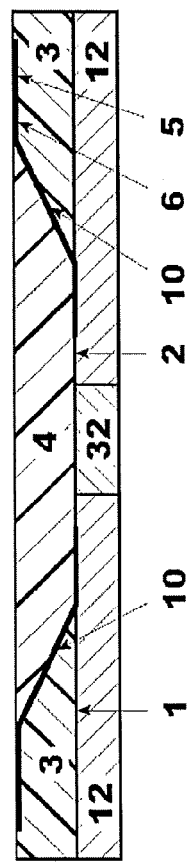

The field grading material layers indicated with reference numeral 10 in FIGS. 9 and 10 can be either applied for each of the cables individually as indicated in FIG. 10, i.e. two separate circumferential and contiguous sections of field grading material layers 10 for each cable and in the central region, essentially around the connecting element 32 connecting the two cable conductors 12, there is no field grading material layer but only the joint inner semicon layer 2. It is however also possible to have one single field grading material layer sleeve as illustrated in FIG. 9, i.e. in one step, field grading material layer 10 tape is wound around the full length of the joint region connecting the two cable outer semicon layers 5 indirectly via the joint inner semicon layer 2 in the central region. The connecting element 32 is formed by the conductor weld. However, other connecting methods as discussed above are also possible, such as a conductor clamp 30 as shown in FIG. 4 or a connecting sleeve 13 as shown in FIG. 2, for example.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

List of Reference Numerals

| | |
|---|---|
| 1 | cable inner semicon |
| 2 | joint inner semicon |
| 3 | cable insulation, polymer layer |
| 4 | joint insulation, polymer layer |
| 5 | cable outer semicon, outer electrode layer |
| 6 | joint outer semicon or conductive rubber, joint outer electrode layer |
| 7 | interface between 3 and 4 |
| 9 | joint |
| 10 | field grading material layer, FGM |
| 11 | line for display of E-field |
| 12 | cable conductor (central electrode) |
| 13 | connecting sleeve |
| 14 | inner surface of the prefabricated cable joint |
| 15 | prefabricated cable joint |
| 16 | field grading material element in the prefabricated joint |
| 18 | outer conductive rubber part of 15 |
| 19 | inner conductive rubber part of 15 |
| 20 | insulation part of 15 |
| 21 | high voltage direct current cable |
| 22 | housing of 15 |
| 23 | region where the conductor is stripped completely prior to joining |
| 24 | region where the cable inner semicon layer is bared prior to joining |
| 25 | region where the cable insulation layer is shaped in a conical manner prior to joining and where the field grading material is to be placed according to the present disclosure |
| 26 | region where the cable insulation layer is bared circumferentially prior to joining |
| 27 | region where the cable outer semicon layer is bared prior to joining |
| 28 | cone |
| 30 | conductor clamp |
| 31 | cable/joint jacket |
| 32 | conductor weld |
| FGM | field grading material |
| α | angle between axial direction and cone surface |

What is claimed is:

1. A method of connecting two high voltage direct current cables in a cable joint, wherein each high voltage direct current cable comprises, from an inside portion to an outside portion in a radial direction, a central electrode, a circumferential cable insulation layer, and an outer electrode layer, the method comprising the steps of:
   a. connecting the central electrode of the two cables;
   b. forming at least one circumferential and contiguous layer of field grading material connecting the outer electrode layer with the central electrode and contiguously covering the cable insulation layer of a respective cable;
   c. forming a circumferential joint insulation layer around the layer of field grading material; and
   d. providing a circumferential joint outer electrode layer connecting the cable outer electrode layers of the two cables,
   wherein a section of the cable insulation layer which is covered by the layer of field grading material in step b is shaped as a cone converging towards a respective terminal end of the respective cable, wherein an angle between an axial direction with respect to an axis of the conductor and a plane of the shaped cone is in a range of 5-45°.

2. The method according to claim 1, wherein each high voltage direct current cable comprises, from the inside portion to the outside portion in the radial direction, the central electrode as a central conductor, an adjacent circumferential cable inner semicon layer, an adjacent circumferential cable insulation layer, and the outer electrode layer as an adjacent circumferential cable outer semicon layer, wherein the method including the steps of:
   i. connecting the conductors of the two cables in a cable joint;
   ii. providing adjacent to the conductors a circumferential joint inner semicon layer connecting the cable inner semicon layers of the two cables;
   iii. providing at least one circumferential and contiguous layer of field grading material connecting the cable outer semicon layer with the joint inner semicon layer and contiguously covering the cable insulation layer of the corresponding cable;
   iv. providing a circumferential joint insulation layer around the layer of field grading material and where appropriate around the joint inner semicon layer; and
   v. providing a circumferential joint outer semicon layer or field grading material layer connecting the cable outer semicon layers of the two cables.

3. The method according to claim 2, wherein for at least one of the steps ii, iii, iv and v, at least one of a polymer based tape of corresponding material is wound around a region to be joined, and a polymer based sleeve is shifted around the region to be joined.

4. The method according to claim 2, wherein after step v, the joint is vulcanised by at least one of applying heat and/or irradiation, and exposing the joint to radial pressure.

5. The method according to claim 2, wherein in step iii, a single circumferential and contiguous layer of field grading material connects the outer electrode layer or the cable outer semicon layer of a first conductor of the cables with the central electrode or with a joint inner semicon layer on one side, and connects the outer electrode layer or the cable outer semicon layer of a second conductor of the cables with the central electrode or with the joint inner semicon layer on another side to completely cover at least one of the central electrode and the joint inner semicon layer in the joint region.

6. The method according to claim 2, wherein the angle between the axial direction with respect to the axis of the conductor and the plane of the cone is in the range of 10-20°.

7. The method according to claim 2, wherein prior to step i, each of the cables is prepared so in that a terminal region of the cable, at least one of the inner electrode and the conductor is completely bared circumferentially, over a length of at least 2-30 cm, wherein in a first region adjacent to the terminal region, the cable inner semicon layer is bared, over a length of 0-10 cm, wherein in a second region adjacent to the first region, the cable insulation layer is shaped in an essentially conical shape converging towards a terminal end of the cable, wherein in a third region adjacent to the second region, the cable insulation layer is bared circumferentially, over a length of 0-10 cm, and wherein in a fourth region adjacent to the third region, at least one of the cable outer electrode layer and the outer semicon layer is bared.

8. The method according to claim 7, wherein: at least one of the inner electrode and the conductor is completely bared circumferentially, over a length of 10-25 cm; in the first region, the cable inner semicon layer is bared over a length of 0.5-5 cm; and in the third region, the cable insulation layer is bared circumferentially over a length of 0.5-5 cm.

9. The method according to claim 1, wherein for at least one of the steps c and d, at least one of a polymer based tape of a corresponding material is wound around a region to be joined, and a polymer based sleeve is shifted around the region to be joined.

10. The method according to claim 1, wherein after step d, the joint is vulcanised by at least one of applying heat and/or irradiation, and exposing the joint to radial pressure.

11. The method according to claim 1, wherein in step b, a single circumferential and contiguous layer of field grading material connects the outer electrode layer or the cable outer semicon layer of a first conductor of the cables with the central electrode or with a joint inner semicon layer on one side, and connects the outer electrode layer or a cable outer semicon layer of a second conductor of the cables with the central electrode or with the joint inner semicon layer on another side to completely cover at least one of the central electrode and the joint inner semicon layer in the joint region.

12. The method according to claim 1, wherein prior to step a, each of the cables is prepared so that in a terminal region of the corresponding cable, at least one of the inner electrode and the conductor is completely bared circumferentially, over a length of at least 2-30 cm, wherein in a first region adjacent to the terminal region, a cable inner semicon layer is bared, over a length of 0-10 cm, wherein in a second region adjacent to the first region, the cable insulation layer is shaped in an essentially conical shape converging towards a terminal end of the corresponding cable, wherein in a third region adjacent to the second region, the cable insulation layer is bared circumferentially, over a length of 0-10 cm, and wherein in a fourth region adjacent to the third region, at least one of the cable outer electrode layer and the outer semicon layer is bared.

13. The method according to claim 12, wherein:
at least one of the inner electrode and the conductor is completely bared circumferentially, over a length of 10-25 cm;
in the first region, the cable inner semicon layer is bared over a length of 0.5-5 cm; and
in the third region, the cable insulation layer is bared circumferentially over a length of 0.5-5 cm.

14. The method according to claim 1, wherein the field grading material used in step b is a polymer based resistive field grading material made of a polymeric matrix provided with a filler, wherein the filler comprises a field grading effective amount of particles of a semiconducting material having an energy bandgap larger than 0 eV and smaller than 5 eV, including at least one of ZnO and SiC, and wherein the particles have at least one dimension smaller than or equal to 100 nm.

15. The method according to claim 14, wherein the particles have at least one dimension between 2-80 nm.

16. The method according to claim 14, wherein the particles have at least one dimension between 5-50 nm.

17. The method according to claim 14, wherein the particles have at least one dimension between 5-30 nm.

18. The method according to claim 1, wherein in step a, terminal end of the central electrode or of the conductors of the cables are shifted and fixed within a sleeve or clamp by at least one of positive engagement, form closure, and closure by adhesive force.

19. The method according to claim 1, wherein the cable inner semicon layer, the cable insulation layer and the cable outer semicon layer are made of one single extruded polymer material, wherein an innermost region of the polymer material is provided with a semiconducting filler to form the inner semicon layer, the cable insulation layer is free of filler, and an outermost region of the polymer material is provided with a semiconducting filler to form the outer semicon layer, and wherein the inner semicon layer has a thickness in a range of 1-3 mm, the cable insulation layer has a thickness in a range of 5-40 mm, and the outer semicon layer has a thickness in a range of 1-3 mm.

20. A method of using the method according to claim 1 for connecting two high voltage direct current cables comprising, from an inside portion to an outside portion in a radial direction, a central conductor, an adjacent circumferential cable insulation layer, and an adjacent circumferential cable outer electrode or outer semicon layer, and outside of the outer semicon layer at least one of the following layers:
swelling tape layer, lead alloy sheath layer, polyethylene jacket layer, tensile armour layer, outer cover layer, aluminium laminate layer, and metallic screen layer.

21. The method according to claim 1, wherein the angle between the axial direction with respect to the axis of the conductor and the plane of the cone is in the range of 10-20°.

22. The method according to claim 1, wherein in step a, the terminal ends of the central electrode are connected using welding techniques.

* * * * *